(12) United States Patent
Fehr

(10) Patent No.: US 6,336,363 B1
(45) Date of Patent: Jan. 8, 2002

(54) WATER LEVEL AND MEASURING APPARATUS

(76) Inventor: Dale Fehr, 17615 Moro Rd., Prunedale, CA (US) 93907

( * ) Notice: Subject to any disclaimer, the term of this patent is extended or adjusted under 35 U.S.C. 154(b) by 6 days.

(21) Appl. No.: 09/624,723

(22) Filed: Jul. 25, 2000

(51) Int. Cl.$^7$ .......................... G01F 23/02; G01F 23/00; G01F 19/00
(52) U.S. Cl. .......................... 73/325; 73/323; 73/290 R; 73/1.73
(58) Field of Search .............................. 73/290 R, 325, 73/1.73; 116/278, 292, 321; 33/700, 559, 501, 432.1

(56) References Cited

U.S. PATENT DOCUMENTS

| | | | | |
|---|---|---|---|---|
| 3,783,690 A | * | 1/1974 | Bridegum et al. ............ | 73/328 |
| 5,323,653 A | * | 6/1994 | Gruett ......................... | 73/326 |
| 5,705,733 A | * | 1/1998 | Jannotta ....................... | 73/1.73 |

* cited by examiner

Primary Examiner—Hezron Williams
Assistant Examiner—Katina Wilson
(74) Attorney, Agent, or Firm—Jeffrey A. Hall

(57) ABSTRACT

A water based level measuring system including a water containing container with a base portion, a bottom and an upright defining chamber for containing water. The water containing chamber has a lower portion with an access opening communicating with the water and having an upper end portion. A measuring indica mechanism is operably linked to the water containing container. The measuring indica mechanism has a housing with a front element and a back element with the front element having a retaining recess for a moveable marked indicator element. The back element of the measuring indica mechanism is configured having a pair of retaining grooves for receiving and retaining a corresponding pair of retaining edges in the front element of the measuring indica mechanism. A tube connects the access opening of the fluid containing container and the measuring indica mechanism.

6 Claims, 2 Drawing Sheets

WATER LEVEL AND MEASURING APPARATUS

BACKGROUND OF THE INVENTION

1. Field of Invention

This invention relates to levels and measuring devices, and in particular to levels and measuring devices using a water based system to measure the elevation at two spaced locations.

2. Description of the Related Art

Heretofore a wide variety of leveling and measuring devices have been proposed and developed. Some prior apparatus have used a water based system to measuring the elevation at two spaced locations. Such devices have used various measuring apparatus where the flow of water from the measuring apparatus through a hose is used to determine the difference in elevations between two points.

Prior methods and apparatuses that utilize water to determine the difference in level between two points have been severely limited because such devices are cumbersome, often requiring stakes or mounting to use, and require multiple calculations to determine the difference in level between two points. Such devices are cumbersome, impractical, and difficult to use, and many of such prior devices have required more than one person to operate. Such limitations have undoubtedly been a reason such devices have not been well received nor commercially successful.

Accordingly, it is the primary object of this invention to provide a leveling device that utilizes water to determine the difference in level between two points, to determine out-of-level, and/or the determination of slope, in a easy, rapid, and efficient manner. The water level of the present invention is simple to use, inexpensive to manufacture, reliable and accurate.

Additional objects and advantages of the invention will be set forth in the description which follows, and in part will be obvious from the description, or may be learned by practice of the invention. The objects and advantages of the invention may be realized and obtained by means of the instrumentality's and combinations particularly pointed out in the appended claims.

BRIEF SUMMARY OF THE INVENTION

The present invention is a novel leveling device which uses water to determine level, out-of-level, and slope. It can be used to level foundations, decks, driveways, lawns countertops, cabinets, ceilings, and the like. The water level of the present invention may be easily operated by one person and can determine level around corners, that is, between two points, one of which is not visible to the user of the device.

To achieve the foregoing objects, and in accordance with the purpose of the invention as embodied and broadly described herein, a water based level measuring system includes a water containing container with a base portion, a bottom and an upright defining chamber for containing water. The water containing chamber has a lower portion with an access opening communicating with the water and has an upper end portion. A measuring indica mechanism is operably linked to the water containing container. The measuring indica mechanism has a housing with a front element and a back element with the front element having a retaining recess for holding and displaying a moveable marked indicator element. The back element of the measuring indica mechanism is configured having a pair of retaining grooves for receiving and retaining a corresponding pair of retaining edges in the front element of the measuring indica mechanism. A tube connects the access opening of the fluid containing container and the measuring indica mechanism, and is positioned in a retaining recess of the housing.

BRIEF DESCRIPTION OF THE DRAWINGS

The accompanying drawings, which are incorporated in and constitute a part of the specification, illustrate a preferred embodiment of the invention and, together with a general description given above and the detailed description of the preferred embodiment given below, serve to explain the principles of the invention.

DETAILED DESCRIPTION OF THE INVENTION

Reference will now be made in detail to the present preferred embodiments of the invention as illustrated in the accompanying drawings.

In accordance with the present invention, there is provided a water based level measuring system with a water containing container with a base portion, a bottom and an upright defining chamber for containing water. The water containing chamber has a lower portion with an access opening communicating with the water and having an upper end portion. A measuring indica mechanism is operably linked to the water containing container. The measuring indica mechanism has a housing with a faceplate, a front element and a back element, with the front element having a retaining recess for a moveable marked indicator element. The back element of the measuring indica mechanism is configured having a pair of retaining grooves for receiving and retaining a corresponding pair of retaining edges in the front element of the measuring indica mechanism. A tube, which may be a replaceable tube, connects the access opening of the fluid containing container and the measuring indica mechanism allowing for the determination of level, out-of-level, and slope between two points.

Figure 1:
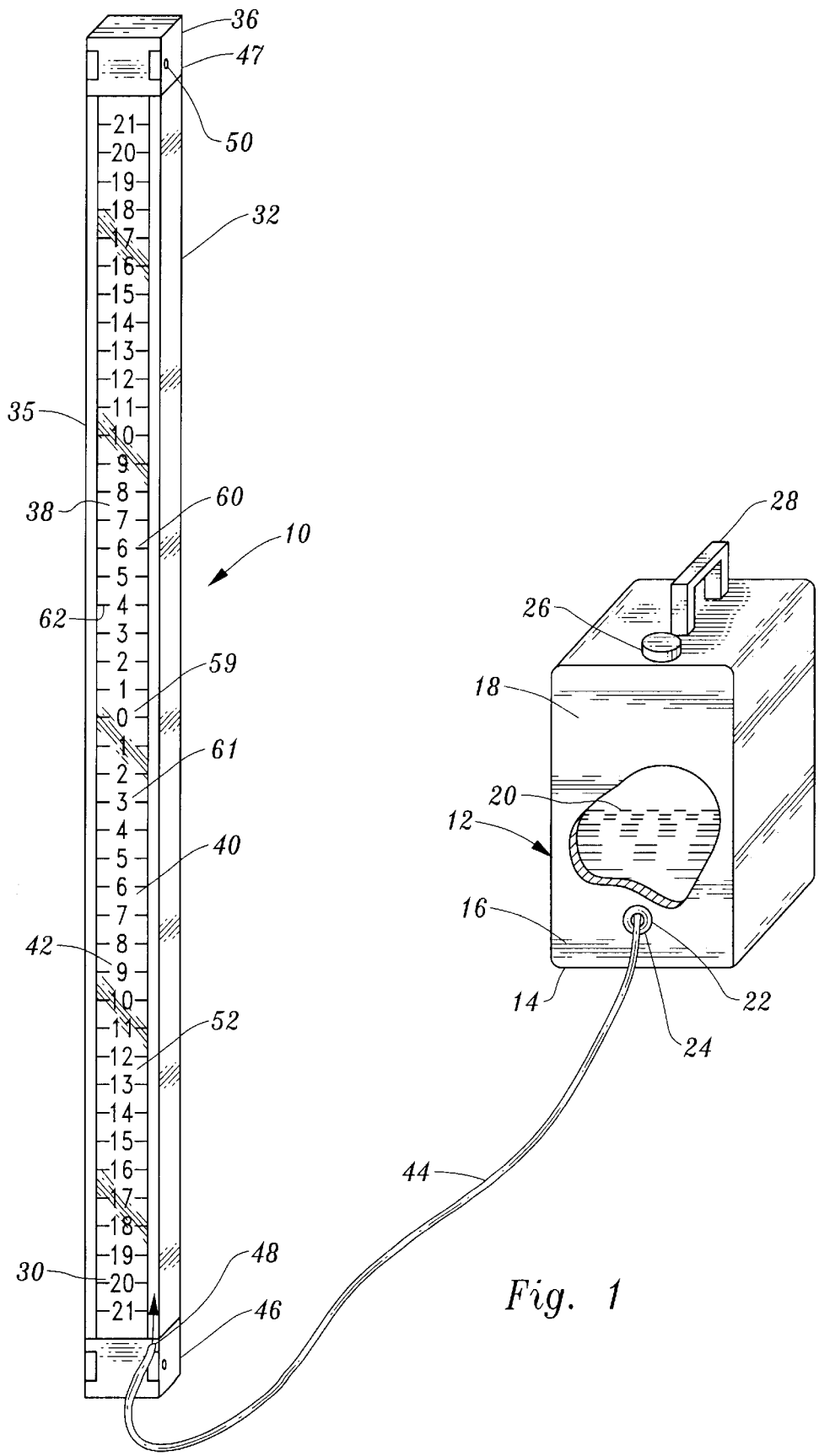
FIG. 1 is a water level and measuring apparatus, according to the invention.

In FIG. 1 a water level and measuring apparatus 10 is shown according to a preferred embodiment of the invention. Preferably, a fluid containing container 12, for holding water 20, or other fluid therein, has a base portion 16 with a bottom 14, and an upright defining chamber 18, for containing water 20. Container 12, preferably has an upper access opening with plug 26, allowing for filling or emptying container 12 with water or other fluid. Chamber 18 has a lower portion with an access opening 22 for a tube 44. Tube 44 is preferably composed of vinyl, however other durable flexible material may be used. Tube 44 is preferably secured by a grommet 24, or other fastening means, which allows for the connection of tube 44 to container 12.

A measuring indica means 30, preferably, housing 32 with a moveable marked indicator tape 42, is in operable communication with water containing container 12. Indicator tape preferably has one side marked to a fraction scale and one side marked to a tenths scale. Housing 32 preferably has a front element 34 and a back element 36, with a faceplate 38 secured to the front of front element 34. Front element 34 preferably is provided with a retaining recess 40 for holding and positioning moveable marked indicator element 42. Tube means, preferably tube 44, provides liquid communication between access opening 22 of container 12, and measuring indicia 30, and extends upwardly in channel 51.

Figure 2:
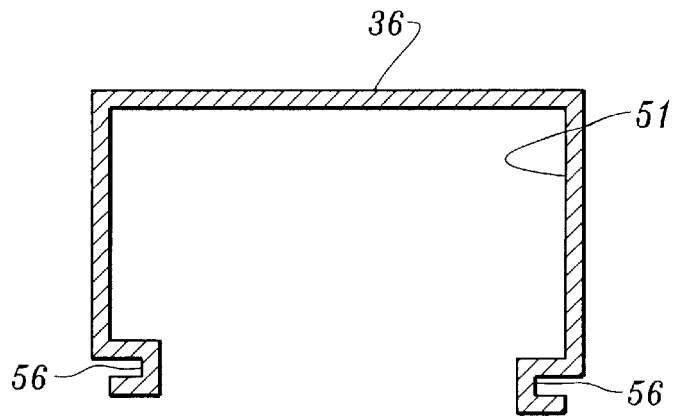
FIG. 2 shows a top view the back element of the measuring indica element of such water level and measuring apparatus, according to the invention.
Figure 3:
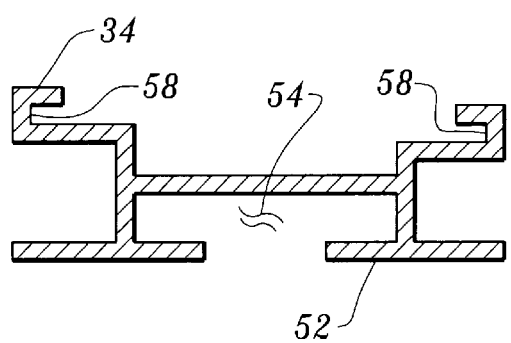
FIG. 3 shows a top view of the front element of the measuring indica element of such water level and measuring apparatus, according to the invention.

With reference now to FIG. 2, back element 36 is shown in a preferred configuration, having a pair of retaining grooves 56, for receiving and retaining a corresponding pair of retaining edges 58 of front element 34, seen in FIG. 3. Front element 34, preferably includes two inwardly protruding edges 52 defining an opening 54 for slideably retaining moveable marked indicator element 42.

Figure 4:
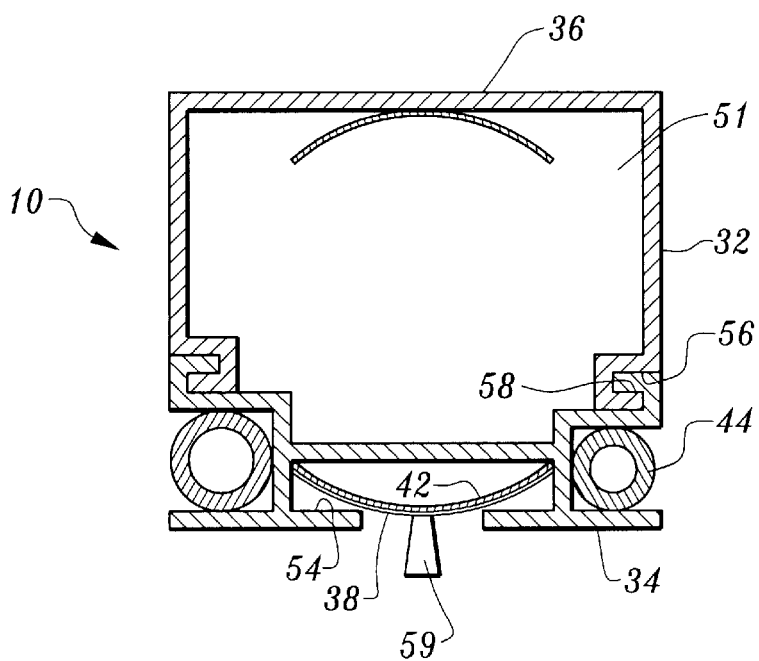
FIG. 4 is a top view of the front element and back element of the measuring indica secured together, according to the invention.

In FIG. 4, front element 34 and back element 36 are shown secured together with inwardly protruding edges 56 secured in retaining grooves 58. Opening or space 54 is configured to adapt and receive measuring indicator tape 42.

As seen in FIG. 1, housing 32, preferably is comprised of front element 34 and back element 36, with faceplate 38 to protect indicator tape 42. Housing 32 is preferably composed of a durable, lightweight material such as aluminum, however other materials may also be used. Faceplate 38 is composed of a clear, durable material, such as butyrate, and forms channel 52 for holding indicator tape 42, and channel 51, for tubing 44, as seen in FIG. 2 and 4. Tube 44 is accordingly positioned near indicator tape 42, either next to the fraction scale or the tenths scale.

Indicator tape 42, is preferably a metal tape, or alternatively plastic, cloth or the like, has a concave surface 61, with indicator marks on the back side thereof. However, in other configurations indicator tape 42 may be flat. Indicator tape 42 is preferably looped or endless. At the center of indicator tape 42 is a small handle 59, to facilitate movement. A scale 62 emanates from this point in either direction from handle 59, and a color scheme, for example, the top half being red to signify lower and the bottom half in black to signify higher, for example, may be used. Preferably, the right side of tape 42 is in tenths and the left side in marked in fractions, however, other indicator markings may also be used. The concave configuration 61, of tape 42, provides a natural tension to the tape when it loops back, due to its looped or endless configuration.

As seen in FIG. 1, endcap 46, preferably has aperture 48 for receiving tube 44. Endcap 46 protects housing 32, holds tube 44 in position, and protects faceplate 38 while keeping dirt and other debris out of channel 54. Endcap 46 is preferably composed of a durable and resilient material such as metal or plastic.

Preferably a binding post 50, is provided to secure endcap 47, and to secure and hold indicator tape 42 taut and in position. While other fastening means may be used, such as rivets, bolts, or rods, binding post 50 is preferred.

Container 12, is preferably provided with handle 28, and plug 26 for ease in filling container 12 with water and for creating an airtight seal. Preferably, container 12 is of sufficient size so that sufficient water horizontal surface area in relation to the inner diameter of tube 44 is achieved. If the horizontal surface area of container 12 is too small, then a change in elevation results in greater error margins in measurement. So while a wide variety of container sizes may be used, a 6"×4.5"×8" size, for example, has been found convenient and efficient.

In operation and use, water level and measuring device 10 is very accurate, easy to use, reliable, and inexpensive to manufacture. Water level 10 may be used to determine level, out-of-level, and slope. In use, there cannot be air bubbles in tube 44, so preferably prior to use, water may be allowed to run through tube 44 until all air bubbles are out. If water level 10 is not used for any lengthy period of time, indicator tape 42 should be reset to an original reference point before using.

If a user wants to determine level, a reference point is chosen, water level 20 in container 12 is placed within the length of water level device 10, and tube 44 within reach all areas to be leveled. The water level device 10 is then placed next to or on the reference point and handle 59 on indicator tape 42 is adjusted until the zero matches the water level in tube 44. Then a measurement is made, either above or below the zero, to the point the user desires to level to, for example 4 inches. Next, water level device 10 is moved to the next point to be leveled, and the zero is matched to the water in the tube, down to the four inch point, and marked. This is the exact level of the reference point.

To determine out-of-level, a reference point is chosen, and container 12 placed so that the water level in container 12 is within the length of water level device 10, and tube 44 will reach all areas to be checked. Water level 10 is positioned on the reference point and handle 59 adjusted until the zero matches the water level in the tube. Water level 10 is moved to each area that is to be checked and readings taken from the water level in tube 44 in relation to indicator tape 42. Using the colored scheme described, readings in red indicate that a spot is below the reference point, and readings in the black portion of indicator tape would indicate the spot is above the reference point.

To determine slope, the method is similar to that of determining level, except the user marks down or up according to how much slope is desired. For example, one quarter inch per foot would indicate that ten feet from the reference point, a mark of 2.5 inches below the reference point would be made.

As is evident from the above description, a wide variety of water levels may be envisioned from the device described herein and additional advantages and modifications will readily occur to those skilled in the art. The invention in its broader aspects is, therefore, not limited to the specific details, representative apparatus and illustrative examples shown and described. Accordingly, departures from such details may be made without departing from the spirit or scope of the applicant's general inventive concept.

What is claimed is:

1. A fluid based level measuring system, comprising:
   a fluid containing container, said fluid containing container having a base portion with a bottom and an upright defining chamber for containing fluid, said fluid containing chamber having a lower portion with an access opening communicating with the fluid and having an upper end portion;
   a measuring indicia means being in operable communication with said fluid containing container, said measuring indicia means having a housing with a front element and a back element, said front element having a retaining recess for a moveable marked indicator element; and
   tube means for providing liquid communication between said access opening of said fluid containing container and said measuring indicia means.

2. The fluid based level measuring system of claim 1, wherein said fluid is water.

3. The fluid based level measuring system of claim 1, wherein said front element of said measuring indica means includes two inwardly protruding edges defining an opening for slideably retaining said moveable marked indicator element.

4. The fluid based level measuring system of claim 1, wherein said back element of said measuring indica means is configured having a pair of retaining grooves for receiving and retaining a corresponding pair of retaining edges in said front element of said measuring indica means.

5. The fluid based level measuring system of claim 1, wherein said tube is composed of a flexible durable material.

6. A water based level measuring system, comprising:

- a water containing container, said water containing container having a base portion with a bottom and an upright defining chamber for containing water, said water containing chamber having a lower portion with an access opening communicating with the water and having an upper end portion;
- a measuring indica means being in operable communication with said water containing container, said measuring indica means having a housing with a front element and a back element, said front element having a retaining recess for a moveable marked indicator element; said back element of said measuring indica means is configured having a pair of retaining grooves for receiving and retaining a corresponding pair of retaining edges in said front element of said measuring indica means.
- tube means for providing liquid communication between said access opening of said fluid containing container and said measuring indica means.

\* \* \* \* \*